(12) United States Patent
Kuskin

(10) Patent No.: US 6,877,029 B1
(45) Date of Patent: Apr. 5, 2005

(54) METHOD AND APPARATUS FOR MANAGING NODE CONTROLLERS USING PARTITIONS IN A COMPUTER SYSTEM

(75) Inventor: Jeffrey S. Kuskin, Mountain View, CA (US)

(73) Assignee: Silicon Graphics, Inc., Mountain View, CA (US)

( * ) Notice: Subject to any disclaimer, the term of this patent is extended or adjusted under 35 U.S.C. 154(b) by 634 days.

(21) Appl. No.: 09/910,629

(22) Filed: Jul. 20, 2001

Related U.S. Application Data

(60) Provisional application No. 60/219,949, filed on Jul. 20, 2000.

(51) Int. Cl.[7] ........................ G06F 15/16; G06F 12/08
(52) U.S. Cl. ...................... 709/213; 711/119; 711/144; 711/145; 711/146
(58) Field of Search ................................ 709/213, 119, 709/144, 145, 146, 141

(56) References Cited

U.S. PATENT DOCUMENTS 5,623,628 A * 4/1997 Brayton et al. ............ 711/141
5,752,264 A 5/1998 Blake et al.
6,209,064 B1 3/2001 Weber
6,516,372 B1 * 2/2003 Anderson et al. ........... 710/300

OTHER PUBLICATIONS

Kien A. Hua et al., "Interconnecting Shared–Everything Systems for Efficient Parallel Query Processing", Proceedings of the First International Conference on Parallel and Distributed Information Systems, pp. 262–270, Dec. 1991.

* cited by examiner

Primary Examiner—Reginald G. Bragdon
(74) Attorney, Agent, or Firm—Baker Botts L.L.P.

(57) ABSTRACT

A partitioned computer system (32) includes a plurality of node controllers (12) connected by a network (14) and partitioned into a plurality of partitioned groups (40). A requesting node controller (34) in one partitioned group (40) requests a latest copy of a line in a memory (17) in a separate partitioned group (40). A storing node controller (36) in the separate partitioned group (40) holding the latest copy of the line in its memory (17) is identified. The requesting node controller (34) transmits its request for a coherent copy of a line to the storing node controller (36). The storing node controller (36) transmits the latest copy of the line in response to the request to the requesting node controller (34) without including the requester in a sharer-tracking process.

14 Claims, 2 Drawing Sheets

METHOD AND APPARATUS FOR MANAGING NODE CONTROLLERS USING PARTITIONS IN A COMPUTER SYSTEM

RELATED APPLICATIONS

This application claims the benefit of U.S. Provisional Application Ser. No. 60/219,949 filed Jul. 20, 2000.

TECHNICAL FIELD OF THE INVENTION

The present invention relates in general to computer system operation and more particularly to a method and apparatus for managing node controllers by using partitions in a computer system.

BACKGROUND OF THE INVENTION

In a conventional multi-processor computer system, multiple node controllers are connected by an interconnection network and communicate among each other over such network. Each node controller manages memory in a region of the computer system's address space, interfaces with attached processors, provides a port to communicate with attached input/output devices, and includes a network interface to provide communications with the interconnection network. The multi-processor computer system may be configured to have separate kernel partitions. When passing critical kernel data between separate kernel partitions, the directory in one partition may contain references to nodes in another partition. Thus, a failure of one partition may cause a failure in another partition. Therefore, it is desirable to provide a technique to manage node controllers in a manner that improves reliability without causing failures in adjacent partitions.

SUMMARY OF THE INVENTION

From the foregoing, it may be appreciated that a need has arisen for a technique to manage node controllers in different partitions of a computer system. In accordance with the present invention, a method and apparatus for managing node controllers by using partitions in a computer system are provided that substantially eliminate or reduce disadvantages and problems associated with conventional computer systems.

According to an embodiment of the present invention, a method for partitioning node controllers without maintaining coherency includes partitioning a plurality of node controllers connected by a network into partitioned groups. A requesting node controller requests a latest copy of a line in memory and identifies a storing node controller in a separate partitioned group holding the latest copy of the line in memory. The method also determines that the partitioned group associated with the requesting node controller, transmits a request for a coherent copy of a line to the storing node controller and transmits the latest copy of the line to the requesting node controller without including the requester in a sharer-tracking process.

In accordance with another embodiment, a system for partitioning node controllers without maintaining coherency includes a computer system having node controllers partitioned in separate groups. The node controllers include a requesting node controller in one partitioned group and a storing node controller in another partitioned group of the computer system. The partitions separate node controllers into at least two partitioned groups. The get message is able to communicate across partitions.

The present invention provides various technical advantages over conventional computer system operation. For example, one technical advantage is to obtain a snapshot copy of coherent data located in another partition. Another technical advantage is to pass the snapshot copy of coherent data from without maintaining coherency in the transferred partition. Yet another technical advantage is to eliminate inter-partition references to data. Other technical advantages may be readily apparent to those skilled in the art from the following figures, description, and claims.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which.

DETAILED DESCRIPTION OF THE INVENTION

Figure 1:
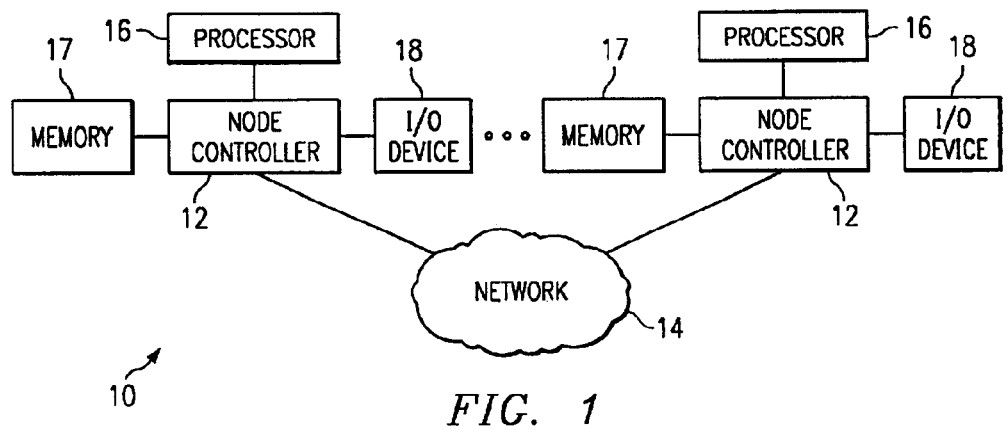
FIG. 1 is a block diagram that illustrates a computer system.

FIG. 1 is a block diagram of a computer system 10. Computer system 10 includes a plurality of node controllers 12 interconnected by a network 14. Each node controller 12 processes data and traffic both internally and with other node controllers 12 within computer system 10 over network 14. Each node controller 12 may communicate with a local processor 16, a local memory device 17, and a local input/output device 18. Computer system 10 may include node controllers 12 without attached processors for configurations that do not require additional processing power but do provide the memory capacity- and input/output port capability for certain applications to be executed in computer system 10.

Figure 2:
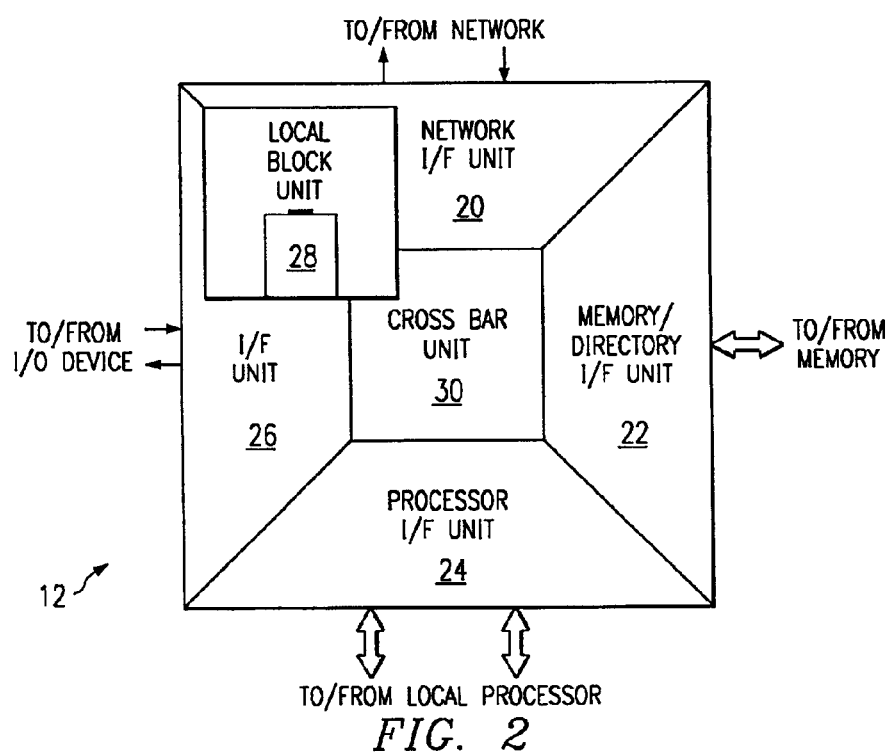
FIG. 2 is a block diagram that illustrates a node controller in the computer system.

FIG. 2 is a block diagram of node controller 12 used in a multi-processor computer system 10. Node controller 12 includes a network interface unit 20, a memory directory, interface unit 22, a processor interface unit 24, an input/output interface unit 26, a local block unit 28, and a crossbar unit 30. Network interface unit 20 may provide a communication link to network 14 in order to transfer data, messages, and other traffic to other node controllers 12 in a computer system 10. Processor interface unit 22 may provide communication link with one or more local processors 16. Memory directory interface unit 22 may provide a communication link with one or more local memory devices 17. Input/output interface unit 26 may provide a communication link with one or more local input/output devices 18. Local block unit 28 is dedicated to processing invalidation requests and programmed input/output operations. Crossbar unit 30 arbitrates the transfer of data, messages, and other traffic for node controller 12.

Figure 3:
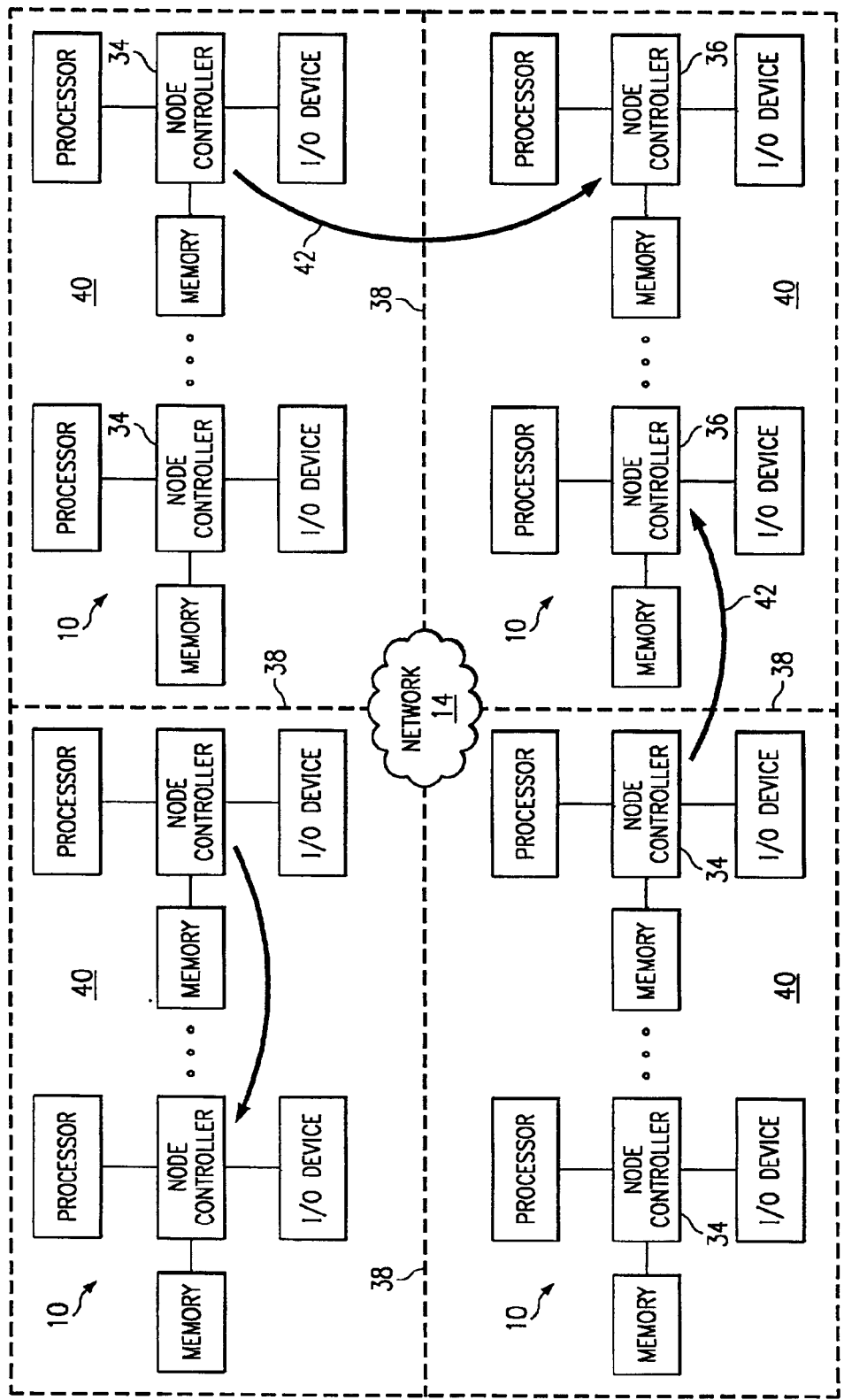
FIG. 3 is a block diagram that illustrates multiple partitions separating node controllers in the computer system.

FIG. 3 shows a partitioned computer system 10 arranged in a manner improving reliability without maintaining coherency. Partitioned computer system 32 includes a requesting node controller 34, a storing node controller 36, a partition 38 separating node controllers 12 into partitioned groups 40, and a get message 42 operable to communicate across partitions 38. Each node controller 12 is associated with a partitioned group 40 such that partition 38 divides node controllers 12 into at least two partitioned groups 40. For example, a computer system 10 might contain one hundred node controllers 12 divided into four partitioned groups, each partitioned group 40 containing twenty-five node controllers 12.

According to the teachings of the described invention, the processor 16 or I/O device 18 will transmit a request, or get message 42, to requesting node controller 34 for a coherent copy of a cache line. Upon receiving the request, requesting node controller 34 will forward the get message 42 on to the memory 17. Memory 17 then must determine which node controller 12 in partitioned computer system 32 holds the latest copy of the line. This is accomplished by identifying all node controllers 12 which maintain a copy of the line in memory 17 and comparing the dates on which the requested line has been changed at each node controller 12. The node controller 12 identified is the storing node controller 36. Requesting node controller 34 then forwards the get message 42 on to storing node controller 36 who in turn replies via network 14 with a latest copy of the line.

Upon receiving the copy, storing node controller 36 must determine whether the partitioned group 40 associated with the requesting node controller 34 is the same as the partitioned group 40 associated with the storing node controller 36. The requesting node controller 34 and the storing node controller 36 may be in different partitioned groups 38. After making this determination, storing node controller 36 will transmit the latest copy of the line to requesting node controller 34 via network 14 without including requesting node controller 34 in a sharer-tracking process.

The state of the line at requesting node controller 34 and storing node controller 36 depends on the type of request 42 issued and whether storing node controller 36 holds the line in an exclusive state. Preferably, the type of request for the latest copy of the line is a get message 42. For such a request, requesting node controller 34 and storing node controller 36 are not marked as sharers and storing node controller 36 will not be notified of subsequent changes made to the line by any other node controller 12. Where storing node controller 36 holds the line in an exclusive state, neither the state of the line at requesting node controller 34 nor the state of the line at storing node controller 36 is changed. In another embodiment, the type of request for the latest copy of the line may be a forced get message 42. Where the storing node controller 36 holds the line in an exclusive state and a forced get message is transmitted, the state of the line at storing node controller 36 is changed but the state of the line at requesting node controller 34 is not changed.

In either embodiment, the request 42 for a cache line across a partition 38 will result in a momentarily coherent copy of the line. Subsequent changes to the line made by requesting node controller 34 or any other node controller will not be updated in the directory of storing node controller 36. In this manner, storing node controller 36 will not be depending on cross-partition notice from requesting node controller 34. Should one partitioned group 40 become inoperable, this will not affect other node controllers 12 located in a different partitioned group 40.

Thus, it is apparent that there has been provided, in accordance with the present invention, a method and apparatus for managing node controllers by using partitioning in a computer system that satisfies the advantages set forth above. Although the present invention has been described in detail, it should be understood that various changes, substitutions, and alterations may be ascertainable by those skilled in the art and may be made herein without departing from the spirit and scope of the present invention as defined by the following claims.

What is claimed is:

1. A method of partitioning node controllers without maintaining coherency, comprising:

partitioning a plurality of node controllers connected by a network into a plurality of partitioned groups;

requesting a latest copy of a line in memory by a requesting node controller;

identifying a storing node controller in a particular partitioned group holding the latest copy of the line in memory;

determining that the particular partitioned group associated with the storing node controller is not one of the partitioned groups associated with the requesting node controller;

transmitting a request for a coherent copy of a line to the storing node controller; and transmitting the, latest copy of the line to the requesting node controller without including the requesting node controller in a sharer-tracking process.

2. The method of claim 1, further comprising:

maintaining at least two partitioned groups; and associating each node controller with a partitioned group.

3. The method of claim 1, wherein the request for the coherent copy is a GET request.

4. The method of claim 1, further comprising:

determining where the latest copy of a line is stored; and communicating the request from the requesting node controller to the storing node controller.

5. The method of claim 4, wherein determining where the latest copy of a line is stored further comprises:

identifying all node controllers which maintain a copy of the line in memory; and comparing the dates on which the requested line has been changed at each node controller.

6. The method of claim 1, wherein the requesting node controller and the storing node controller are not marked as sharers and are not notified of subsequent changes to the line made by the requesting node controller.

7. The method of claim 1, wherein the line held by the storing node controller is in an exclusive state and neither the state of the line at the storing node controller nor the state of the line at the requesting node controller are changed.

8. The method of claim 1, wherein the line held by the storing node controller is in an exclusive state and the state of the line at the storing node controller is changed but the state of the line at the requesting node controller is not changed.

9. A system operable to partition node controllers without maintaining coherency, comprising:

a plurality of node controllers including a requesting node controller and a storing node controller in a computer system;

a plurality of partitions separating node controllers into at least two partitioned groups;

a get message operable to communicate across partitions from a requesting node controller to a storing node controller, the get message requesting a latest copy of a line to be sent to the requesting node controller in a particular partition, the particular partition not maintaining coherency of the line.

10. The system of claim 9, wherein the requesting node controller and the storing node controller are in different partitioned groups.

11. The system of claim 9, wherein the get message requests a coherent copy of the line.

12. The system of claim 9, wherein the requesting node controller and the storing node controller are not marked as sharers and are not notified of subsequent changes to the line made by the requesting node controller.

13. The system of claim 9, wherein the requested line is held by the storing node controller in an exclusive state and neither the state of the line at the storing node controller nor the state of the line at the requesting node controller is changed.

14. The system of claim 9, wherein the requested line is held by the storing node controller in an exclusive state and the state of the line at the storing node controller is changed but the state of the line at the requesting node controller is not changed.

\* \* \* \* \*